March 15, 1949. L. A. TROFIMOV 2,464,275
SPEED CONTROLLED POWER UNIT AND TRANSMISSION
Filed June 24, 1944 3 Sheets-Sheet 1

INVENTOR.
LEV A. TROFIMOV
BY Harry P. Canfield
ATTORNEY

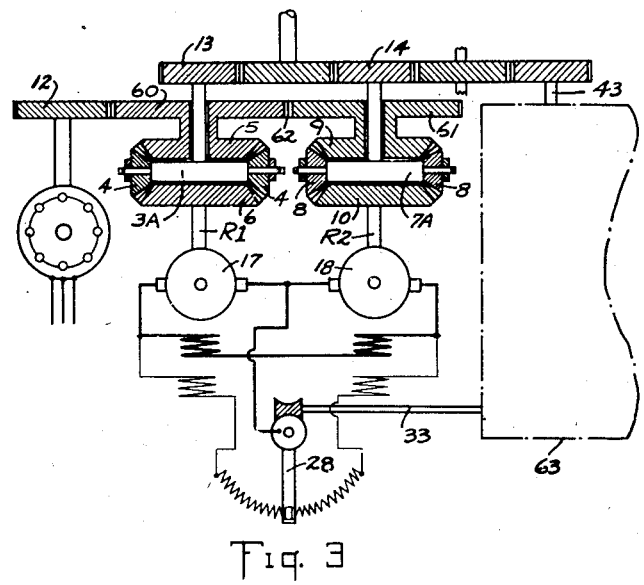

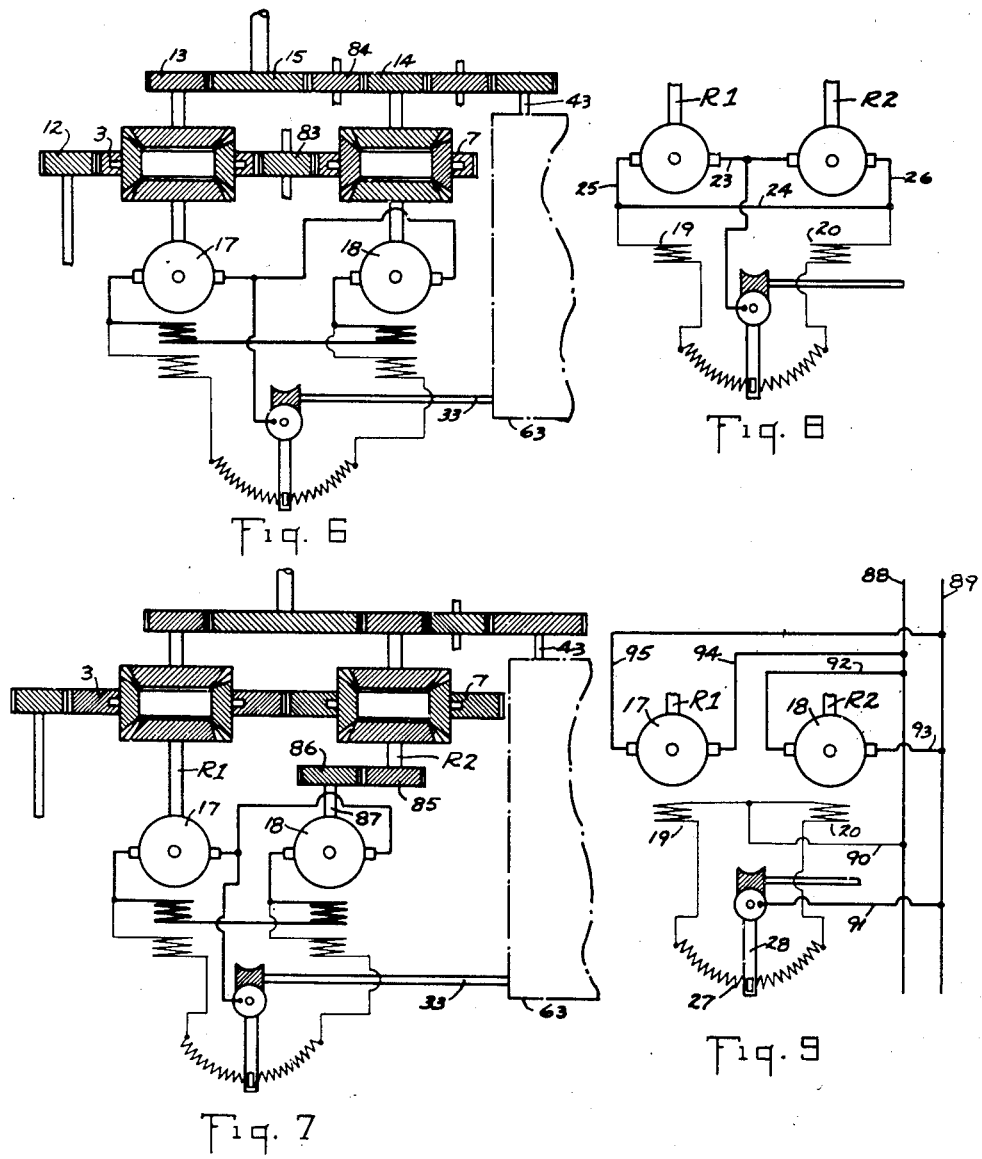

Patented Mar. 15, 1949

2,464,275

UNITED STATES PATENT OFFICE 2,464,275

SPEED CONTROLLED POWER UNIT AND TRANSMISSION

Lev A. Trofimov, Willoughby, Ohio

Application June 24, 1944, Serial No. 541,882

6 Claims. (Cl. 318—13)

This invention relates to power transmissions, and particularly to transmissions for transmitting to a load, the power of a motor which runs continuously at full speed or at high-power, efficient speed; the control of the transmitted power being effected by control of the transmission as distinguished from control of the motor.

The invention may be embodied in various forms of the transmission, and in various forms of the control for the transmission, corresponding to the type of load to be driven and the manner in which it is to be driven; and accordingly the invention is adaptable to loads which are to be started and driven at constant speed, or at variable speed, in either the forward or the reverse direction, or brought to rest in either direction; or to loads of either the overhauling or non-overhauling type; or to loads that are to be started and move to a desired position and brought to rest in that position etc.; or to moving loads that are to be braked to stop them.

The power transmission as herein disclosed may be constructed as a self-contained servo-unit of large or small horsepower, and with or without the motor or the control as a part of the unit, or the transmission or control may be constructed as a part of the machinery or apparatus to be driven.

In either case the transmitted motor power is applied to the load by a power output element which may conveniently be, and preferably is, a rotary power output shaft.

An embodiment of all of the inventive subject matter therefore comprises in general a continuously running power input motor, a power output element or shaft, a transmission between the motor and output shaft, and control means controlling the transmission, to control the movement, speed, direction, angular position, braking, etc. of the output shaft.

In one aspect, the invention comprises, besides the rotary output element, differential gearing, and means to cause balanced torques, derived from the motor, to be developed in the gearing and applied to the output element in opposite directions when the output element is at rest, and to cause the torques applied to the output element to be unbalanced and one of the torques to predominate over the other to drive the output element, in one direction or the other from rest. A load being driven by the output element may therefore be brought to dead rest and positively held at rest, even if it be an overhauling load, by dynamic braking, and then may be driven again in the same direction or in the reverse direction, without cessation of driving torque. Lost motion or back-lash in the gearing when going to and away from dead rest or when going through dead rest upon reversal, is eliminated, and very accurate control of the output shaft at low speed as well as at high speed is made possible.

In another aspect, the invention comprises a transmission including a pair of constantly rotating master elements upon which torques are developed; and a control for the transmission including means to balance or unbalance the torques applied to the output element, as aforesaid, by balancing or unbalancing the relative torques on the master elements; the said torques on the constantly rotating master elements being developed by drag or brake loads thereon, or by a brake load torque on one and a motor load torque on the other, and in either case without physical contact with the master elements, but through a wearless torque transmitting medium whereby wear due to the variable retarding or driving of the constantly rotating master elements and variability of operation due to wear, are avoided.

The preferred means to develop said torques on the master elements, and described herein, is by means of a pair of electric generators, constituting a part of the transmission, and both developing load torques, or one developing load torque and supplying current to drive the other as a motor to cause it to develop motor torque; and various controls to balance and unbalance the torques of the master elements to effect balance and unbalance of torques on the output element, as aforesaid, are illustrated and described hereinafter in connection with various embodiments of the invention.

The objects of the invention are to provide a transmission and a control therefor having the features and mode of operation referred to above, and as more fully described hereinafter; the invention itself being set forth in the claims appended hereto.

My invention is fully disclosed in the following description taken in connection with the accompanying drawing, in which:

Fig. 3 is a view similar to Fig. 2 in which the power input and output occur at other elements of said differential gearing;

Fig. 4 is another view similar to Fig. 2 in which the power input and output occur at other elements of the differential gearings;

Figs. 6 and 7 are views illustrating modifications of the embodiment of Fig. 2 and in which certain elements of Fig. 2 are caused to rotate in directions other than those shown in Fig. 2;

Fig. 8 is a fragmentary view similar to a part of Fig. 2 illustrating a modification;

Fig. 9 is a fragmentary view similar to a part of Fig. 2 illustrating another modification;

Figures 1, 2, 5, 10, 11:
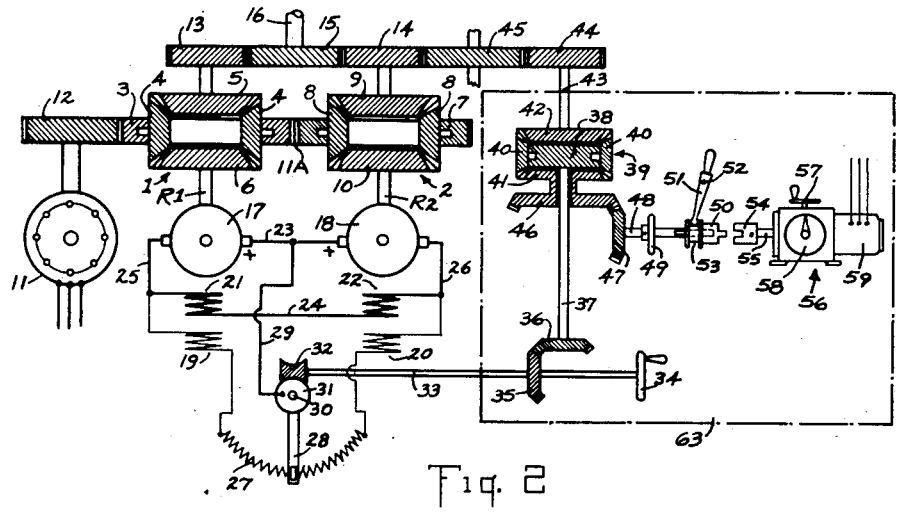
Fig. 1 is a diagrammatic view illustrating diagrammatically certain elements of embodiments of my invention in the succeeding figures, among which are master rotary elements R1 and R2 to which torques are applied in the control of a power output element.
Fig. 2 illustrates diagrammatically an embodiment of my invention in which the torques on the master elements R1 and R2 are controlled by electro-dynamic units in the form of electric generators; and illustrating power input and power output respectively at certain corresponding elements of a pair of differential gearings.
Fig. 5 is a view similar to Fig. 2 in which the two differential gearings are disposed in series relation instead of in parallel relation as in Fig. 2.
Fig. 10 is a view similar to Fig. 2 illustrating another modification.
Fig. 11 is a fragmentary view similar to a part of Fig. 2 illustrating a modification of the means for controlling a rheostat of Fig. 2.

The underlying principle of all of the embodiments of my invention, hereinafter set forth, is illustrated diagrammatically in Fig. 1. The load L is driven by a power output element or shaft O. The transmission T develops two torques which are either opposite or additive, and either balanced or unbalanced and applies them to the output element O to either hold it at rest, or bring it to rest, or rotate it in one direction or the other at a corresponding speed when the torques are unbalanced and one predominates over the other more or less or one assists the other.

Power is put into the transmission T by the motor M, which runs continuously in one direction, whereby it may be a constant speed motor and operate at all times at high efficiency and may, accordingly, be of smaller rated horsepower than would be possible if its speed were varied or if it were started and stopped in driving the output shaft. It may be any kind of a motor: electric, internal combustion, etc., and for the purposes of this disclosure will be considered as an electric motor; and to further demonstrate the advantages of the invention, it will be considered as an alternating current induction motor of the squirrel cage type, inasmuch as such motors, while highly advantageous because of their rugged, simple, construction, and because of the general use of alternating current, have heretofore introduced complications when applied to variable speed power output uses.

The said torques on the output element O are effected by corresponding relative torques on continuously rotating master elements R1 and R2 of the transmission; and the value and direction thereof are controlled by the control C.

Various constructions of the transmission T, and of the control C will now be described.

Referring to Fig. 2 of the drawing, which in somewhat diagrammatic form illustrates one embodiment of my invention, I have shown a double differential gearing comprising a differential gearing 1 and a differential gearing 2.

The differential gearing 1 comprises a carrier or spider element 3 rotatably supporting a pinion or pinions 4, meshing with differential gears 5 and 6.

The differential gearing 2 comprises similarly a carrier or spider element 7 rotatably supporting a pinion or pinions 8—8 meshing with differential gears 9 and 10.

In this embodiment of my invention it is contemplated that the spider elements 3 and 7 are to rotate in opposite directions at equal speeds and to this end are of equal diameter and are provided with gear teeth on their outer peripheries meshed with each other as shown at 11A; and in this embodiment of my invention it is also contemplated that the motor power input is to be at the spiders 3—7; and accordingly, the power supplying, continuously running motor 11 drives a gear 12 meshed with one of the spider elements, for example the spider element 3.

Connected to the differential gears 5 and 9 respectively are gears or pinions 13 and 14, meshed with a gear 15, to which is connected the power output element 16, which in this embodiment is a rotary output shaft.

The differential gears 6 and 10 are connected to shafts R1 and R2, which are connected to the rotors of electric generators 17 and 18; these generators, in this embodiment, being direct current generators provided with shunt field windings 19 and 20 and series field windings 21 and 22.

The shafts are designated as R1 and R2 and therefore are indicated as being the master rotary elements referred to above and shown in Fig. 1; but as will be apparent, the differential gears 6 and 10 can likewise be considered as the master rotary elements.

As will presently be more fully described, the generators 17 and 18 in general develop electrical loads when driven, and torques therefore develop in the shafts R1 and R2 and differential gears 6 and 10.

Since the spiders 3 and 7 are driven in opposite directions, the torques developed in the shafts R1 and R2 will be in opposite directions, and this causes torques to be developed in opposite directions in the differential gears 5 and 9, and the gears or pinions 13 and 14. The differential gears 5 and 6 tend to rotate in the same direction as their associated spider 3, and the differential gears 9 and 10 tend to rotate in the same direction as their associated spider 7.

In general, with this arrangement as will be apparent, if there be little or no electrical load on either of the generators 17 or 18 so that very little torque is necessary to drive them, they will be driven at equal speeds and at twice the speed of their associated spiders 3 and 7; and the same small torque that is developed in the differential gears 6 and 10 to drive them, will be developed in the differential gears 5 and 9, and in opposite directions, and the output shaft 16 will remain at rest; but if one of the generators, say the generator 18 is caused to develop substantial electrical load, it will require more torque to drive the differential gear 10, than that to drive the differential gear 9, and the differential gear 10 and its shaft R2 will slow down, and the differential gear 9 will speed up, and more torque will be developed in the differential gear 9 and pinion 14 than in the differential gear 5 and pinion 13, and the pinion 14 will turn the gear 15 and the output shaft 16; and the gear 15 will rotate the gear or pinion 13 and the differential gear 5, which will cause the differential gear 6 to speed up, and speed up R1. As a matter of fact, in a gearing arrangement of this type, the arithmetical sum of the speeds of the shafts R2 and R1 will always be a constant.

If the generators 17 and 18 were caused to generate substantial electrical loads and therefore required torque and power to rotate them, they would be analogous to brakes on the shafts R1 and R2.

Then by suitably controlling the generated braking loads of the generators 17 and 18, to make them equal, the output shaft 16 could be caused to remain at rest or be brought to rest; and by making one generator load greater than the other the output shaft could be caused to rotate in one direction or the other and at a speed commensurable with the difference of the generated loads.

If the generators 17 and 18 both acted at all times as generators, in this manner, the electrical energy which they developed would have to be absorbed or dissipated in some manner.

In the embodiment of my invention of Fig. 2, I take advantage of the fact above mentioned that regardless of their relative speeds, the arithmetical sum of the speeds of the shafts R1 and R2 is a constant, and utilize this fact in a manner to put back into the mechanical system the energy developed as generated electrical load, to control the motion of the output shaft 16, so that the energy to retard or brake the shafts R1 and R2 is not lost, and all of the energy put into the system by the motor 11, except for incidental losses, is applied to the output shaft 16.

To this end, the generator which is loaded to cause the output shaft 16 to rotate, delivers its energy to the other generator and drives it as a motor, and tends to drive it at a speed above the speed at which it runs in maintaining the arithmetical sum of the speeds constant as referred to, by which motor action the braking, generated, electrical load is converted into mechanical power and put back into the gearing system. In a sense, the motor power thus put back into the gearing system is first supplied by the motor 11, and when put back into the system supplements the power from the motor 11.

In carrying out this improvement, as in Fig. 2, and bearing in mind that the two generators 17 and 18 are driven in opposite directions, I provide suitable polarity for the series windings 21 and 22 and the shunt windings 19 and 20, and suitable circuits for energizing them, and for providing a load circuit and a motor circuit.

To this end, two of the terminals or brushes of the generator 17 and 18 of like polarity, for example positive polarity as indicated, are connected together by a wire 23; the two series field windings 21 and 22 are connected in series by a wire 24, and their other ends are connected by wires 25 and 26 to the other terminals of the generators. The stunt field windings 19 and 20 are connected respectively at one end to the wires 25 and 26 and at their other ends are connected in series with a rheostat resistor 27. A rheostat arm 28 is arranged to rotatably move over the resistor 27, and arm 28 is connected by a wire 29 to the wire 23.

A main load circuit is thus provided by the wires 23, 24, 25, and 26 and the series field windings 21 and 22.

When the generators 17 and 18 are running at equal speeds and are equally energized by their shunt windings 19 and 20, their polarities oppose and are equal, and no current flows in the main load circuit, including the series fields 21 and 22. Each generator however energizes its own shunt field winding through a local circuit across its terminals, so that each generator develops substantially full potential.

The rheostat arm 28 obviously will have an intermediate position on the resistor 27 at which the fields 19 and 20 are equally energized and at which the potentials of the generators 17 and 18 are equal and opposed. Movement of the rheostat arm from the intermediate position, say toward the right as viewed in the drawing, will strengthen energization of the field winding 20 and weaken that of the field winding 19.

The potential of the generator 18 will thereby be increased over that of the generator 17. Current will then flow in the said load circuit including the series field windings 21 and 22. The series field winding 22 are arranged as to polarity so that this load current will still further increase the excitation of the generator 18, and still further increase its potential; and so that the series field winding 21 will still further weaken the excitation of the generator 17.

The load current from the generator 18 will now flow through the generator 17, in the direction to operate it as a motor, and because of its weakened field it will tend to run at a high speed. At the same time the increased load on the generator 18 will cause the latter to slow down.

Even if the rotor of the generator 17 were not driven as a motor, it would tend to be driven at increased speed when the rotor of the generator 18 slowed down, because of the said relations which cause the arithmetical sum of the speeds of the two to be always constant, but, operating as a motor, it tends to run faster than that speed and therefore its motor power is given to the shaft R1 and put back into the system, and applied to the shaft 16 by the gear 13.

Obviously either of the units 17 or 18 may be caused to operate as a generator, and the other as a motor, by the corresponding movement of the rheostat arm 28 from its intermediate position, so that as the net result, when the arm 28 is put in a certain intermediate position on the resistor 27, the output shaft 16 is held at rest by opposed torques; and if the arm 28 be moved in one direction on the resistor 27, the output shaft will be rotated in one direction, and if it be moved in the other direction the output shaft will run in the other direction. If the arm 28 be moved to slow down the generator 18, the direction of rotation of the shaft 16 will be determined by the gear 14; and will be determined by the gear 13 if the generator 17 is the one that is slowed down.

The speed at which the output shaft runs is determined by the amount of generator load which in turn is determined by the extent of movement of the rheostat arms 28 from its intermediate position; and if, with the output shaft 16 running, the rheostat arm 28 be returned to its intermediate position, causing the torques applied to the output shaft by the gears 13 and 14 to again become equal and opposite, the output shaft 16 will come to rest. With two opposing torques on the shaft 16 when at rest, then when one predominates to again turn the shaft, all lost motion is already taken up by that torques which increases and predominates, and this is true no matter in which direction, forward or reverse, the shaft turns, as will now be more fully explained.

In view of the foregoing it will be apparent that if the output shaft is connected to an ordinary inertia load and the load is at rest, the two torques applied to it will be equal and opposite, and lost motion is all taken up in both gearings; and that when one generator (say 18) is loaded more than the other, the torque of the gear 14 simply increases in magnitude without change of direction to turn the gear 15 and accelerate the load (without introducing gear tooth backlash) and the gear 13 tends to be driven in the direction opposite to that in which its torque is exerted and therefore tends to drive the generator 17 by the gears at a certain increased speed; but the generated load, driving the generator 17 as a motor, tends to drive it above the speed at which it tends to be driven by the gears, and the motor action therefore reverses the direction of the torque of the gear 13 (which may introduce momentary back-lash lost motion in one set of the gearing) and thereupon the gear 13 begins to apply torque to the gear 15 and to the load to help drive the load in the same direction as the gear 14 is driving it. But it will be observed that smooth, starting, and acceleration of the load is not interfered with by the said momentary backlash of the gear 13, because the load is started from rest and driven by the primary torque of the gear 14 which is developed without back-lash.

With such ordinary inertia load the foregoing is true regardless of the direction in which the load is driven. It follows therefore that there is never cessation or interruption of torque on the load shaft 16, in going from rest (zero speed) to speeds in either forward or reverse direction, or in going through zero speed from either direction, or in returning to zero speed.

The above described operation presupposes that when the output shaft 16 is at rest and free of overhauling load, the shunt field windings 19 and 20 are equally energized; and that the generators 17 and 18 are running at equal speeds; and that the spiders 3 and 7 and gears 13 and 14 are of equal diameter; and that the two differential gearings 1 and 2 are identical as to gear ratios and diameters; that is to say that the two parts of the system associated respectively with the differential gearings 1 and 2 are identical and that the transmission as a whole is symmetrical. It is believed to be apparent that the same end result will be obtained with two differential gearings and generator systems which are not identical or symmetrical as the result of differences in the gear diameters and differences in the generators 17 and 18.

Again, if the load is an overhauling type of load, (as when the shaft 16 drives a hoist cable drum) then, when it is at rest, one generator (say the generator 18) will be loaded more than the other; the gear 14 will be applying torque in the direction to hold the load; the other generator (17) will be receiving current from the generator 18 and will be acting as a motor, and exerting torque at the gear 13, which torque also will be in the direction to hold the load. To start and accelerate the overhauling load (or to allow it to overhaul), the generated load of the generator 18 will be still further increased (or will be decreased) and the torques of the gears 14 and 13 will accordingly both increase in magnitude (or both decrease) without change of direction and therefore without any introduction of backlash, or any cessation of torques, as the speed of the load changes from, or to, or through zero speed.

It is believed therefore that the fundamental principle of the invention is more generally expressed by saying that certain elements and functions are "balanced" when the output shaft 16 is at rest, than by saying that they are equal, and this includes "balanced" energization of the shunt windings 19 and 20, "balanced" potentials and speeds of the generators, and "balanced" speeds and torques of the shafts R1 and R2, and "balanced" torques on the shaft 16 when at rest; and that it is more generally true to say that the "balanced" torque on the output shaft, when it is at rest, which results from two opposing torques, (or, as in the case of an overhauling type of load and the generator-motor, feed-back principle, results from three torques) eliminates back-lash lost motion by the fact that when the output shaft moves from rest it moves because of a change of the magnitude of the movement effecting torque without change of its direction, whether the movement be from, or to, or through zero speed.

As to the movement of the rheostat arm 28 in the embodiment of Fig. 2, this may be effected by various means to accomplish various load driving purposes and characteristics, several of which means have been shown in Fig. 2 and either of which may be used optionally.

The rheostat arm 28 is connected to a shaft 30 upon which is mounted a worm gear 31 meshed with a worm 32 on a shaft 33 to which is connected a hand wheel 34 for rotating the shaft.

A bevel gear 35 connected to the shaft 33 meshes with a bevel gear 36 on a shaft 37 connected to the spider element 38 of a differential gearing shown generally at 39. The spider 38 rotatably supports pinions 40—40 meshed with differential gears 41 and 42. The differential gear 42 is connected by a shaft 43 to a gear 44 driven upon rotation of the output shaft 16, and preferably through an idler 45 meshed with a gear or pinion 14 and with the gear 44. The differential gear 41 is connected to a bevel gear 46 meshing with a bevel gear 47 on a shaft 48 to which is connected a hand wheel 49 for turning the shaft.

The shaft 48 extends beyond the hand wheel 49 and has a clutch element 50 splined for axial movement thereon, effected by rocking movement of a lever 51 pivoted at 52, and having its end disposed in a groove 53 associated with the clutch element 50. A corresponding clutch element 54 is connected to the shaft 55 of a motor driven unit 56. The unit 56 may be any one of the known or commercial units comprising a variable speed transmission, an output shaft 55, and a motor for driving the output shaft through the transmission, and the transmission being provided with adjustable means for varying and setting the speed of the output shaft 55, and for maintaining it constantly at any set speed. The transmission 56 illustrated is provided with a hand wheel 57 for adjusting the speed of the output shaft 55, and a dial and scale 58 for indicating direction and speed at which it is set, and a motor 59 for driving it.

Assuming that the load connected to the output shaft 16 is one whose speed and direction is to be controlled by hand, the clutch 50—54 is first disconnected by operating the lever 51. The hand wheel 34 is then turned, turning the shaft 33, and this as will be apparent, acting through the worm 32 and worm gear 31, will move the arm 28 over the rheostat 27 in one direction or the other from its intermediate point, to cause the output shaft 16 to rotate in one direction or the other, and at a speed proportional to the extent of movement of the arm 28. To stop the output shaft from rotating the arm 28 may be rotated back to its intermediate point by the hand wheel 34.

For any position of the arm 28, the output shaft will tend to rotate at a corresponding speed, determined by the speed to which the generator (17 or 18) which is operating as a generator, is slowed down by the electrical load which it generates; and the torque available to drive the output shaft 16 is equal to the torque required to drive the generator at its developed electrical load plus the torque of the other generator driven as a motor. If the load being driven should vary, the speed of the output shaft will tend to vary, although the transmission is self-regulating to a degree in this respect, because, (assuming that the unit 18 is the one which is acting as a generator), if the load on the output shaft should increase it will tend to slow down the differential gear 9 and speed up the differential gear 10 and speed up the generator 18, causing it to generate more electrical load and develop more torque to meet the increased torque requirement of the load.

To bring the load to rest the hand wheel 34 is turned to move the arm 28, to its intermediate position of balance. The load can thus be driven in the forward direction or the reverse direction at different speeds, or brought to rest by the hand wheel 34. For overhauling loads the arm 28 would be stopped at one side of its middle position, as will be understood.

During this control, and referring to the differential gearing 39, the differential gear 42 will be rotated, and this, acting through the pinion 40, will rotate the differential gear 41 and the gear 47 and the hand wheel 49, idly; but the shaft 37 will not be driven, thereby. The shaft 37 will be rotated idly by the hand wheel 34.

Again, if the load on the output shaft 16 is one which it is desired to drive accurately at a constant preselected speed, then the clutch 50—54 would be engaged by the lever 51, and the hand wheel 57 would be turned to set the transmission 56 to drive its output shaft 55 at a set constant speed.

It may be assumed here for simplicity, that the output shaft 16 is at rest, and that the rheostat arm 28 is in its said intermediate position of balance. The transmission 56 now rotates the shaft 48, gears 47 and 46 and the differential gear 41. The differential gear 42 is at rest and the gear 41 acting through the pinions 40—40 turns the spider 38, and the shaft 37, and the gears 36 and 35, and the shaft 33, thereby moving the rheostat arm 28 over the resistor, causing the output shaft 16 to rotate, at increasing speed. This rotational movement of the shaft 16, acting through the idler 45 and the gear 44 and shaft 43, turns the differential gear 42 in the direction opposite to the direction of the differential gear 41, and the increasing speed of the gear 42 brings it up to a speed at which it equals that of the gear 41; and thereupon the spider 38 and the shaft 37 stop rotating and stop moving the arm 28, and the output shaft 16 thereafter rotates at the speed which it has by this time attained. If the output shaft 16 should, because of an increase of load thereon, tend to slow down, it will slow down rotation of the differential gear 42; and the gear 41, rotating at its constant speed will rotate the spider 38 and cause the arm 28 to be moved on the resistor to bring the speed of the output shaft back again to its preselected speed. Any tendency of the output shaft to increase in speed, is correspondingly corrected by movement of the rheostat arm 28 in the other direction by a similar response of the differential gearing 39.

The speed of rotation of the output shaft can at any time be set to a different constant speed by operation of the hand wheel 57 of the transmission 56.

During this regulation the hand wheel 34 will rotate idly as will the hand wheel 49.

In this connection it should be observed that the motor driven transmission unit 56 may be of very small fractional horsepower, incapable of driving by itself the load of the output shaft 16, whereas the motor 11 and the output shaft 16 and the associated elements of the transmission may be of large size able to transmit great horsepower, the unit 56 being merely a speed reference unit having only enough power to operate the rheostat arm 28.

Again, in some cases, the output shaft 16 will be connected to a load which is to be positioned. Illustrative of such uses is the aiming of guns by motor power. In such a case, the output shaft 16 is to be rotated, preferably at high speed for a number of revolutions and then automatically slowed down and stopped. To effect this control, the clutch 50—54 is disengaged and the hand wheel 49 is turned. This turns the gears 46 and 47, and, through the pinions 40, turns the spider 38 and the shaft 37 and moves the rheostat arm 28 to cause the output shaft to rotate.

Rotation of the output shaft acting through the idler 45 and 44, turns the differential 42 in the direction to tend to neutralize the effect of rotation of the gear 41. Thus, so to speak, the differential gear 42 tries to catch up with the gear 41. The faster the wheel 49 is turned the more will the speed of the gear 41 stay ahead of the gear 42 and keep the rheostat arm 28 moving farther and farther from its mid-position. There is a speed of rotation for the wheel 49 at which the arm 28 will become stationary on the resistor 27, and cause the output shaft to have a corresponding speed. If the rotation of the hand wheel 49 is slowed down below that speed or is stopped altogether, then the speed of the gear 42 will catch up with and overcome the speed of the gear 41, and turn the shaft 37 in the other direction, to return the arm 28 back toward its position of balance, slowing down the output shaft 16, and when the arm reaches the position of balance the output shaft will stop rotating.

During this control the hand wheel 34 rotates idly.

In the case of control by the hand wheels 34 or 49, the load, whether it is an overhauling load (as when the shaft 16 drives a hoist cable drum) or whether it is one moving with great inertia, improved dynamic braking may be had by the transmission.

Heretofore dynamic braking has been effected by causing the power input motor itself to act as an electric generator driven by the load. Such prior dynamic braking is highly effective (although requiring complications of electric circuits and contacts to control them) but only at high speeds of the load. As the load is slowed down, the generator is driven more slowly and generates decreasing electric power and decreasing braking torque; and is therefore less effective as a brake at low speeds and wholly ineffective as the load approaches zero speed, and to stop and hold the load, a supplemental friction brake has had to be added.

With the present invention, movement of the rheostat arm 27 controls the direction of torque on the output shaft 16 independently of the speed or direction of the output shaft. To quickly brake and stop an overhauling load or a load of great inertia, the rheostat arm may be moved to a position which reverses the direction of torque on the output or load shaft. This brakes the load and as it slows down and approaches rest, the rheostat arm may be returned toward its intermediate position and arrive there when the load comes to rest (if it be an inertia load) or stop short of that position so as to maintain a load holding torque (if it be an overhauling load). As much torque as desired may thus be applied to brake the load, from high speed all the way to zero speed; and in fact, if the braking torque thus developed is not removed by return movement of the arm 28 when the load is brought to rest, it will immediately reverse the load under full power and torque; and this latter action, which is sometimes wanted, corresponds to the action obtained with conventional motor controls and is known as "plugging" the motor.

No additional elements are required to provide such dynamic braking with the transmission above described.

The transmission may be controlled by the hand wheel 49 as above referred to, to effect the driving of loads in the forward or reverse direction at different speeds, or to bring it to rest, instead of by the hand wheel 34, and when so doing, an additional feature of control may be had to advantage. Upon turning the hand wheel 49, (assuming for the sake of simplicity that the load is at rest), the gears 47 and 46 rotate the differential gear 41 and the pinions 40, and the pinions acting upon the stationary gear 42 as a fulcrum, rotate the spider 38 and shaft 37 and shaft 33 to move the arm 28 to start the output shaft 16. This starts rotation of the differential gear 42. The hand wheel 49 may be turned at a sufficiently rapid speed so as to cause the arm 28 to be moved a corresponding distance along the resistor 27 before the differential gear 42 "catches up" with the differential gear 41, so that the output shaft may be caused to attain a desired speed. If now the hand wheel 49 be released, the rheostat arm 28 will stay in its moved position for that speed of the output shaft, and the rotating differenial gear 42 will rotate the gear 41, and, through the gears 46 and 47, will cause the hand wheel 49 to continue to rotate idly. The output shaft therefore will continue to be driven at its desired speed. To bring the load to rest, the hand wheel 49 may be grasped and its rotation stopped. The differential gear 41 then becomes the fulcrum, and the rotating gear 42 will rotate the spider 38 to restore the arm 28 in the other direction to its intermediate position at which the output shaft will come to rest. If, instead of merely stopping the hand wheel 49, it be rotated in the opposite direction, the arm 28 will be restored more rapidly to more rapidly stop the load, or if the hand wheel 49 be turned fast enough and far enough in the opposite direction, the arm 28 will move beyond its intermediate position and stop the load by the plugging action referred to above.

As mentioned before, any one of the several controls herein described and shown in Fig. 2 may be used alone; or any of them in combination with another; the reason for illustrating and describing all of them in connection with the embodiment of Fig. 2 being to simplify the drawing which otherwise would require numerous additional figures.

It will be observed that the power of the continuously running electric motor 11 transmitted to the output shaft 16 to hold it at rest positively, or to drive it in either direction with a range of speeds, or to brake and stop, or stop and reverse it, etc., is brought about by changing the relative speeds and torques of a pair of rotating master elements of the transmission; and that in the embodiment of Fig. 2 this is done by changing the relative degree of energization of a pair of electromagnetic windings 19 and 20. Also, because the master elements R1 and R2 are continuously running, a range of speed from zero to maximum, of the output shaft 16, is obtained for a small range of speed of the master elements R1 and R2.

Also, as will be apparent the full range of speed and torque of the output shaft is the same in either direction of rotation.

In Figs. 3 and 4 are modifications of the embodiment of Fig. 2 in which a different arrangement of the gears of the two differential gearings is provided.

In Fig. 2 above described, the power input is at the spider elements of the differential gearings 1 and 2, and the generators and output shaft are driven respectively by differential gears of the gearings.

In Figs. 3 and 4, the same reference characters as in Fig. 2 are used, as far as practicable, and a brief description will therefore be sufficient. Referring to Fig. 3, the differential gear 5 has a spur gear 60 connected thereto, and the differential gear 9 has a spur gear 61 connected thereto, the two gears 60 and 61 being meshed with each other as at 62. The motor driven gear 12 is meshed with the gear 60 and drives the gears 60—5 and 61—9 in opposite directions. Power is thus put in at these differential gears. The spider 3A rotatably supporting the pinions 4—4 is connected to the gear 13, and the spider 7A rotatably supporting the pinions 8—8 is connected to the gear 14. Power is thus taken out at the spiders.

The generators 17 and 18 are connected to the differential gears 6 and 10, by their shafts R1 and R2.

In Fig. 4, a spur gear 64 is connected to the differential gear 6, and a spur gear 65 is connected to the differential gear 10, and the gears 64 and 65 are meshed together at 66, and driven in opposite directions by the motor driven gear 12 meshed with the gear 64. Power is thus put in at these differential gears, 6 and 10. The gears or pinions 13 and 14 are connected respectively to the differential gears 5 and 9; power is thus taken out at these differential gears 5 and 9. The spiders 3B and 7B are connected to the shafts R1 and R2 of the generators 17 and 18.

In either of the forms of Fig. 3 or Fig. 4, the rheostat arm 28 may be moved by any of the control means illustrated in Fig. 2 and described in connection therewith, and this has been indicated by enclosing such control means in Fig. 2 within the rectangle 63, and reproducing only the rectangle 63 in Figs. 3 and 4, and showing that the shafts 33 and 43, lead into said rectangle as they do in Fig. 2, this being done to simplify the drawing.

In the forms of Figs. 2, 3, and 4 it will be noted that in each case there are two differential gearings; power is put into the transmission at two homologous gears or elements of the two gearings to drive them; two other homologous gears of the two gearings are connected to electric generators to drive them; and the remaining homologous gears of the two differential gearings are connected to the output shaft. The two differential gearings in these arrangements may for convenience be referred to as differential gearings in parallel arrangement.

In the modification of Fig. 5 two differential gearings are shown interconnected in such manner that they may for convenience be referred to as two differential gearings in series relation. Power is put into the transmission at the spider element of one gearing, and taken out at the spider element of the other gearing and one gearing as a whole is driven by the other.

The two gearings are indicated generally at 67 and 68. The gearing 67 comprises a spider element 69 rotatably supporting pinions 70—70 meshed with a differential gear 71 having connected thereto a spur gear 72, and meshed with a differential gear 73 having connected thereto a spur gear 74. The spider 69 has teeth on its periphery and is driven by the gear 12 which is driven by the motor 11.

The differential gearing 68 has a spider element 75 rotatably supporting pinions 76—76 meshed with a differential gear 77 having a spur gear 78 connected thereto, and meshed with a differential gear 79 having a spur gear 80 connected thereto. The spider 75 is connected to the output element or shaft 16. The spur gears 72 and 78 are meshed together as at 81. The spur gears 74 and 80 are rotatably connected together by means of an intermediate idler 82 meshed with them.

The generator 17 is in this case driven by a master rotary element R1 connected to the differential gear 73; and the generator 18 is driven by a rotary master element R2 connected to the differential gear 77.

Preferably the gears 72 and 78 are of the same diameter; and the gears 74 and 80, of the same diameter; and the differential gears 71, 73, 77, and 79 of the same diameter; it being contemplated that the output shaft 16 will be at rest when the two generators 17 and 18, preferably alike, are driven at equal speeds; although as hereinbefore referred to, this identity or equality of parts associated with the two differential gearings is not necessary.

The electric circuits for the generators 17 and 18 are shown as being the same as in the form of Fig. 2. For an intermediate position of the rheostat arm 28, the generators 17 and 18 will have equal opposing potentials and equal loads, represented by the current loads of their shunt field windings 19 and 20. In this connection, the gears 72 and 78 being meshed together will rotate in opposite directions and rotate the generators 17 and 18 oppositely.

With equal torques on the master rotating elements R1 and R2, and with the arrangement illustrated, the differential gears 71 and 73 and their associated gears 72 and 74 will all rotate in unison with the spider 69; and the differential gear 77 and its associated gear 78 will rotate at the same speed as the differential gear 79 and its associated gear 80 but in opposite direction relative thereto.

The spider 75 and the output shaft 16 will therefore remain at rest.

If the load on one generator, for example the generator 18, be increased by movement of the rheostat arm 28, that load will slow down the master element R2 and the gears 77, 78 and 72, 71; and this will cause the gears 73, 74, 80 and 79 to increase in speed. The increase of the speed of the differential gear 79 over that of the differential gear 77 will cause the spider 75 and output shaft 16 to rotate, but the electrical load of the generator 18 is converted into motor power at the generator 17, and it assists in driving the gear 73, and from it the gear 79, so that the electric load of the generator 18 is not lost, but is converted into mechanical power and put back into the system.

A similar action occurs if it is the generator 17 which is slowed down by an increase of electrical load, the output shaft 16 however then rotating in the other direction.

A comparison of this form of Fig. 5 with that of Fig. 2 shows the following. In the form of Fig. 2, slowing down of the generator 18 by electrical load thereon slows down the differential gear 10 of the gearing 2, and causes the differential gear 9 of the same gearing to speed up and drive the output shaft 16.

In the form of Fig. 5, slowing down the generator 18 by electrical load thereon slows down the differential gear 77 of the differential gearing 68, but this (acting through the gears 78 and 72 and 71) causes the differential gear 73 of the other differential gearing 67 to speed up and drive the output shaft 16.

In both forms, the direction of torque applied to turn the output shaft 16 is determined by that master element, R1 or R2, which is slowed down by its generator load.

There are manufacturing advantages in the form of Fig. 2 inasmuch as the two differential gearings may be identical, whereas in the form of Fig. 5 they are not identical.

While in most cases it will be preferred to drive the two differential gearings, for example the gearings 1 and 2 of Fig. 2, in opposite directions, this is not essential; and Fig. 6 illustrates an arrangement for driving them in the same direction from the motor gear 12. To this end, a gear 83 in the form of an idler is disposed between the spiders 3 and 7 and meshed with their teeth, the gear 12 driving the spider 3 in one direction, and, through the idler 83, driving the spider 7 in the same direction. In order that the torques on the gear 15 applied thereto by the gears 13 and 14 may be in opposite directions, an idler gear 84 meshed with the gear 15 and the gear 14 is interposed therebetween. The brushes or terminals of the generator 18 are interchanged where they connect with the circuits. It is believed apparent that with these differences the transmission of Fig. 6 will operate in all respects like that of Fig. 2.

Fig. 7 is introduced to show that while the spiders 3 and 7 in the transmission of Fig. 2 may as in that figure be driven in opposite directions, the two generators 17 and 18 may be driven in the same direction, this being done by a gear 85 on one of the master rotary shafts or elements, for example R2, meshed with a gear 86 on the shaft 87 of the generator 18 which reverses its direction of rotation. Here as in Fig. 6 the brushes or terminals of the generator 18 are interchanged in the electric system.

In some cases, it may be desired to utilize shunt wound generators instead of the compound wound generators of Fig. 2; and this is illustrated in Fig. 8, the wires 23, 24, 25, and 26 providing the main load circuit for the generators, and the shunt windings 19 and 20 alone controlling the generators, and the rotational speeds of master rotary elements R1 and R2.

While it is preferred to provide, for the two generators 17 and 18, their own self-exciting field circuits, and a local load circuit, as described hereinbefore, they may, instead of that arrangement, be connected as shown in Fig. 9 to a pair of direct current supply mains 88 and 89. In this arrangement also, as in Fig. 8, the series windings of the generators have been omitted. The shunt field windings 19 and 20 are connected at one of their ends by a wire 90 to one of the supply mains 88, and current flowing through them flows through opposite end portions of the resistor 27, through the arm 28, and by a wire 91 to the other supply main 89. The generator 18 has its brushes or terminals connected by wires 92 and 93 to the mains 88 and 89, and the generator 17 similarly has its brushes connected to the mains 88 and 89 by wires 94 and 95.

With this arrangement, when the two generators 17 and 18 are rotating at equal speeds, (assuming that they are identical in construction, or, if as mentioned hereinbefore, due to lack of symmetry of the two differential gearings by which the shafts R1 and R2 are driven, they are driven at balanced speeds), and with the arm 28 in an intermediate position on the resistor 27, the potentials of the two generators 17 and 18 will be equal to and oppose the potential of the mains 88 and 89, so that no generated current flows.

As an alternative, the potentials of the generators may be made greater than that of the mains 88 and 89 in which case each of them pumps current back into the supply mains 88 and 89. Accordingly this arrangement could be used in a transmission such as that shown in Fig. 2, if it be desired to cause the torque applied by the gears 13 and 14 to the gear 15, when the output shaft 16 is at rest, to be greater torque than would be developed by the generators 17 and 18 in Fig. 2 as the result of the output load of each of the generators due to its supplying current to its own shunt field windings, only.

In either case, if the arm 28 is moved on the resistor 27 to energize one of the generators, say the generator 18 more strongly than the generator 17 by strengthening the field winding 20 and weakening the field winding 19, the output load of the generator 18 will be increased and slow down the master element R2 and apply moving torque to the output element as described in connection with Fig. 2. This, because of the gear arrangement, will, as mentioned above, cause the generator 17 to rotate at a higher speed since the sum of the speeds of the shafts R1 and R2 will at all times be a constant, but the weakening of the field 19 of the generator 17 and the application of potential from the mains 88 and 89 to its terminals will cause current to flow through it from the mains 88 and 89 and cause it to run as a motor.

If the potentials of the generators are, at all positions of the arm 28, greater than the potential of the mains 88 and 89, the generators will always pump current back into the mains, and the generator loads will be merely braking loads on the master elements R1 and R2; and the feed-back principle, developed as above described when one generator is driven as a motor by the other generator, will be absent, and this may be in some cases desirable.

Here again as in the form of Fig. 2 the generator 17 operating as a motor will put power back into the system, and as will be apparent, this will be power derived in effect from the generator 18.

In some cases it may be desirable, (as, for example when the generators 17 and 18 are of large size) to energize their shunt fields from a separate source or from an exciter; and in some cases it may be desirable to utilize two separate resistors one for each shunt field. These modifications, either of which may be employed separately, are shown in Fig. 10. The generators 17 and 18 have a common load circuit 96 including series fields (which may be omitted if desired), and their shunt fields 19 and 20 are energized across mains 97 and 98 in parallel, the field 19 being in series with a resistor 99, and the field 20 in series with a resistor 100; the arm 28 having a bridging element 101 bridging both resistors. The generators operate on the feed-back principle above described when one drives the other as a motor; and for an intermediate position of the arm 28, the resistors will energize the generator fields in balanced condition as defined above.

It may be desired in some cases to change the energization of only one of the fields when the arm 28 is moved from its intermediate position and in such cases the arrangement of Fig. 11 may be utilized. Here, the arm 28, besides contacting the resistor 27, contacts an arcuate contact 102, and the contact 102 is connected to the intermediate point of the resistor 27 by a connection 103. When the arm 28 is moved say toward the right as viewed in Fig. 11, the energization of the field winding 19 remains unchanged but the energization of the field winding 20 is increased.

It is believed that it will be understood by those skilled in the art, how to select a commercial motor 11, and commercial generators 17 and 18 which are to operate both as generators and as motors, for a given horsepower rating of the transmission and a given range of speeds for the output shaft 16; but in order to facilitate the same, the following is given, with reference to the particular embodiments illustrated diagrammatically, in Figs. 2, 3, 4, and 5.

In Fig. 2, it will be convenient to provide a gear reduction speed ratio of 2 to 1, between the pinion 12 driven by the motor 11, and the spiders 3 and 7 as approximately illustrated; and to provide a motor 11 having a normal working speed of 1800 R. P. M. With both generators 17 and 18 rotating at the same speed, and the load shaft 16 at rest, the generators will then rotate at 1800 R. P. M. It will be suitable to be able to load either generator (say the generator 18) so that, as a generator it will run as low as 900 R. P. M. and so that the other generator (17) will run as a motor at 2700 R. P. M. to provide a suitable range of speed in either direction for the load shaft.

To do this, and using the field windings 21 and 22 with which the selected commercial generators are provided, a resistor 27 is chosen such that the fields will be energized below saturation when running at 1800 R. P. M. to enable their energizations to be increased to correspond to a loaded decreased speed of 900 R. P. M. The concurrent speed of the other unit will then be 2700 R. P. M. Units 17 and 18 and a resistor 27 will therefore be selected which will, on weakening the field of one by the resistor 27 and increasing that of the other, have a range of speeds, operating as generators, from 1800 to 900 R. P. M. and a range of speeds, operating as motors from 1800 to 2700 R. P. M.

For a motor 11 rated at 10 horsepower, the units 17 and 18 may conveniently be rated at 6 horsepower; and the output at the shaft 16 may then be rated at 7.5 horsepower.

In the forms of Figs. 3 and 5, the same considerations obtain except that, for a motor speed of 1800 R. P. M. the speeds of the generators when equal will be 900 R. P. M., and operating as generators will have a speed range of 900 to 450 R. P. M. and as motors a range of 900 to 1350

R. P. M., but if preferred their speed ranges may be the same as for Fig. 2 by using a 3600 R. P. M. motor 11.

In the form of Fig. 4, for a motor 11, speed of 1800, the generator speeds when equal will be only 450 R. P. M. giving a generator speed range of 450 to 225 and a motor speed range of 450 to 675. These speed ranges are low for commercial units so that for Fig. 4, it may always be more suitable to use a motor 11 of 3600 R. P. M.

The subject matter of this application is in part a continuation of the subject matter of my co-pending application, Serial No. 436,309, filed March 26, 1942 now Patent 2,384,776, September 11, 1945; and is in part, divisional therefrom.

The foregoing description sets forth the principles and mode of operation of my invention in a number of embodiments and modifications. Details of the various embodiments not illustrated nor described will be understood by those skilled in the art who may want to practice the invention. Other modifications and changes in the embodiments and modifications illustrated and described will occur to those skilled in this art; and my invention comprehends all such changes and modifications which come within the scope of the appended claims.

I claim:

1. A power transmission comprising a power output element; a pair of differential gearings; each gearing comprising three elements, namely, a spider element rotatably supporting a pinion, and two gears meshed with the pinion; an element of each gearing being continuously driven by power and continuously driving a second element of each gearing; a third element of each gearing being connected to the output element; means developing torques on the constantly driven second elements to cause the third elements to apply torques to the output element; control means to control the torques on the second elements to control the torques applied to the output element and to balance and unbalance them, to cause the output shaft to have zero speed when the applied torques are balanced and to rotate in forward or reverse direction when the said applied torques are correspondingly unbalanced, and to have a rotational speed determined by the degree of applied torque unbalance; said torque developing and control means comprising an electric generator driven by each continuously rotating element, the generators connected in output-potential-opposition in a common load circuit and having shunt field windings and circuits energized by the generator output potentials respectively; a rheostat operable to vary, relatively, the energization of the field windings; to cause the generated potentials to be equal and to supply field energizing current only, or to cause the potential of one generator to exceed that of the other and supply current to the load circuit and thereby drive the other as a motor.

2. A power supplying unit comprising a rotary power output shaft adapted to be connected to a load, a transmission for transmitting power to the output shaft, means by which power may be continuously supplied to the transmission, a pair of rotary master elements associated with the transmission and continuously driven by supplied power, a pair of electric generators continuously driven by the driven master elements respectively and each having its own self-energized field; operable rheostat means to vary relatively the energization of the fields to balance and unbalance them, load circuit means comprising an interconnecting circuit for the generators, the transmission applying balanced opposing torques to the output shaft when it is at rest and free from torque of a load, responsive to the balanced torques developed at the master elements by balanced electrical loads of the driven generators effected by balanced energization of the fields, and applying mutually assisting torques to the output shaft to drive it in one direction or the other, or to hold it at rest against torque of a load, responsive to the generator-load-torque developed at one master element and the motor-torque developed at the other master element, effected by unbalanced energization of the fields which causes the generator electrical load generated in said circuit by one generator to drive the other as a motor.

3. A power supplying unit comprising, a rotary power output shaft adapted to be connected to a load, a pair of differential gearings each comprising three elements, namely, a spider element rotatably supporting a pinion, and two gears meshed with the pinion; the spider element of each gearing arranged to be continuously driven by power and then continuously driving a second element of each gearing; a third element of each gearing being connected to the output shaft, a pair of electric generators continuously driven by the continuously driven second elements respectively, and each having its own self-energized field operable rheostat means to vary relatively the energization of the fields to balance and unbalance them, load circuit means comprising an interconnecting circuit for the generators, the third elements applying balanced opposing torques to the output shaft when it is at rest and free from torque of a load, responsive to the balanced torques developed at the second elements by balanced electrical loads of the driven generators effected by balanced energization of their fields, and applying mutually assisting torques to the output shaft to drive it in one direction or the other or to hold it at rest against torque of a load, responsive to the generator-load-torque developed at one second element and the motor-torque developed at the other second element, effected by an unbalanced energization of the fields which causes the electrical load generated by one generator when driven as a generator to drive the other as a motor.

4. The transmission described in claim 2 and in which the operable rheostat comprises a movably positionable element which in each position thereof effects and maintains a corresponding relative energization of the fields.

5. The transmission described in claim 2 and in which the operable rheostat comprises a rheostat movable element which, in different positions thereof, effects corresponding relative energization of the fields; and in which a three element gearing has one element thereof driven from the output element, and another element thereof connected to the rheostat movable element to position it, and a third element connected to an operable element to be moved thereby to effect movement of the rheostat movable element to positions of unbalanced field energization during movement of the operable element, and by which the rheostat movable element is moved to a position of balanced field energization upon cessation of movement of the operable element.

6. The transmission described in claim 2 and in which the operable rheostat comprises a rheostat movable element which, in different positions thereof, effects corresponding relative energization of the fields; and in which a three element gearing has one element thereof driven from the output element, and another element thereof connected to the rheostat movable element to position it, and a third element connected to an operable element to be moved thereby to effect movement of the rheostat movable element to positions of unbalanced field energization during movement of the operable element, and in which power driven means continuously drives the operable element at selected fixed speeds to predetermine a continuous fixed relative energization of the fields.

LEV A. TROFIMOV.

REFERENCES CITED

The following references are of record in the file of this patent:

UNITED STATES PATENTS

| Number | Name | Date |
|---|---|---|
| 1,593,343 | Merrill | July 20, 1926 |
| 2,117,340 | Maurer | May 17, 1938 |
| 2,248,942 | Black | July 15, 1941 |
| 2,330,397 | Trofimov | Sept. 28, 1943 |
| 2,331,761 | Black | Oct. 12, 1943 |
| 2,348,211 | Frische | May 9, 1944 |